United States Patent
Son et al.

(10) Patent No.: US 9,429,447 B2
(45) Date of Patent: Aug. 30, 2016

(54) METHOD OF UTILIZING IMAGE BASED ON LOCATION INFORMATION OF THE IMAGE IN ELECTRONIC DEVICE AND THE ELECTRONIC DEVICE THEREOF

(71) Applicant: Samsung Electronics Co., Ltd., Suwon-si, Gyeonggi-do (KR)

(72) Inventors: Dong-Il Son, Seongnam-si (KR); Sung-Jun Kim, Daegu (KR); Jin-Hong Jeong, Yongin-si (KR); Kyung-Hee Lee, Ansan-si (KR); Ju-Yeong Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/667,073

(22) Filed: Mar. 24, 2015

(65) Prior Publication Data

US 2015/0356749 A1    Dec. 10, 2015

(30) Foreign Application Priority Data

Jun. 10, 2014  (KR) .......................... 10-2014-0070120

(51) Int. Cl.
*G06T 7/60*  (2006.01)
*G01C 21/36*  (2006.01)

(52) U.S. Cl.
CPC ....... *G01C 21/3667* (2013.01); *G01C 21/3614* (2013.01); *G01C 21/3682* (2013.01)

(58) Field of Classification Search
CPC ............................. G01C 21/34; G06T 11/00
USPC ....................................................... 701/454
See application file for complete search history.

(56) References Cited

U.S. PATENT DOCUMENTS

| 6,504,571 | B1 * | 1/2003 | Narayanaswami | G06F 17/30265 |
| | | | | 348/231.99 |
| 7,379,811 | B2 | 5/2008 | Rasmussen et al. | |
| 7,610,560 | B2 * | 10/2009 | Horvitz ................. | G01C 21/36 |
| | | | | 701/423 |
| 2005/0270311 | A1 | 12/2005 | Rasmussen et al. | |
| 2007/0096945 | A1 | 5/2007 | Rasmussen et al. | |
| 2011/0054785 | A1 * | 3/2011 | Wood ..................... | G01C 21/00 |
| | | | | 701/533 |
| 2011/0316885 | A1 | 12/2011 | Kim et al. | |
| 2013/0218463 | A1 * | 8/2013 | Howard ............ | G06F 17/30657 |
| | | | | 701/533 |

FOREIGN PATENT DOCUMENTS

| JP | 2002-72869 A | 3/2002 |
| KR | 10-2008-0044610 A | 5/2008 |
| KR | 10-2011-0139375 A | 12/2011 |

\* cited by examiner

*Primary Examiner* — Thomas Tarcza
*Assistant Examiner* — Alex C Dunn
(74) *Attorney, Agent, or Firm* — Jefferson IP Law, LLP

(57) ABSTRACT

An image utilizing method based on location information of an image is provided. The method includes displaying an image, setting a Region Of Interest (ROI) on the image, obtaining location information associated with the ROI, and storing the obtained location information together with an image of the ROI. The location information is stored together when the ROI is designated and thus, it is possible to provide various services based on the location information.

20 Claims, 13 Drawing Sheets

METHOD OF UTILIZING IMAGE BASED ON LOCATION INFORMATION OF THE IMAGE IN ELECTRONIC DEVICE AND THE ELECTRONIC DEVICE THEREOF

CROSS-REFERENCE TO RELATED APPLICATION(S)

This application claims the benefit under 35 U.S.C. §119 (a) of a Korean patent application filed on Jun. 10, 2014 in the Korean Intellectual Property Office and assigned Serial number 10-2014-0070120, the entire content disclosure of which is hereby incorporated by reference.

TECHNICAL FIELD

The present disclosure relates to a method of utilizing an image based on location information of the image in an electronic device and a device thereof.

BACKGROUND

An electronic device directly controlled by a user includes at least one display device. The user controls the electronic device through an input device while viewing operations of an application executed on the display device of the electronic device. The user may desire to store the application execution screen as it is or may desire to memorize the content of the screen. Currently, an electronic device, such as a portable phone, provides a screenshot function, a clip board function, and the like.

Among those functions, the screenshot function stores the whole screen as in image format. The clip board function stores and displays a cut or copied object according to a cut or copy command. A desired screen image, text, and the like may be stored from the application execution screen, through the screenshot function, the clip board function, and the like, according to the request of the user. Accordingly, the user is capable of accessing the stored content whenever needed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a screenshot is stored merely with a file name assigned for the screenshot or with a brief description input for the screenshot. A user may have difficulty in remembering the circumstance where the screenshot is obtained, based on the stored screenshot. In addition, the information inputting scheme is based on merely a scheme that requires a user to directly input information. In this manner, in the case of the clip board function, an object, such as text, an image, and the like, is displayed in a form of a simplified image or an icon, on the clip board. In this instance, a date and time when the object is generated may be displayed together.

As described above, information associated with an object may be stored together with the object such as text, the image, and the like. However, when the user desires to access the stored object, the electronic device merely displays the object and information stored together. The electronic device connects the object to a related application such as a document viewer, a gallery, or the like by identifying the type of the object, for example, text, an image, or the like.

Another aspect of the present disclosure is to provide a method of improving utility of collected information or multiple pieces of information associated with an image of a selected region based on the image and the data collected together, and an electronic device thereof. Another aspect of the present disclosure is to provide a method of providing a service by utilizing information associated with an image based on the image of a region selected by a user, and an electronic device thereof.

Another aspect of the present disclosure is to provide a method of readily managing information associated with a Region Of Interest (ROI) by storing an image of the ROI selected by a user from an image including location information together with location information of the ROI, and an electronic device thereof.

In accordance with an aspect of the present disclosure, a method of utilizing an image based on location information of the image in an electronic device is provided. The method includes displaying an image, setting a ROI on the image, obtaining location information associated with the ROI, and storing the obtained location information together with an image of the ROI.

In accordance with another aspect of the present disclosure an electronic device that utilizes an image based on location information of the image is provided. The electronic device includes a display unit configured to display an image, a memory including a storage area for a clip board, and a controller that executes a control to set a ROI on the image, to obtain location information of the ROI, and to store the obtained location information together with an image of the ROI.

According to various embodiments of the present disclosure, when a user designates a desired region in a state in which an image including location information is displayed in an electronic device, the electronic device may automatically extract location information associated with an image of the designated region and thus, the user does not need to input location information associated with the designated region for each time, and the user may more conveniently use the device.

According to various embodiments of the present disclosure, location information is further stored in addition to an image of a ROI and thus, the ROI may be readily managed and utilized.

According to various embodiments of the present disclosure, an image of a ROI on an image including location information and actual location information of the ROI on a map are stored together and thus, the information may be used for providing a location related service. Accordingly, the utility of the image of the ROI may be increased based on the location information associated with the image of the ROI and the information may be connected with various services.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
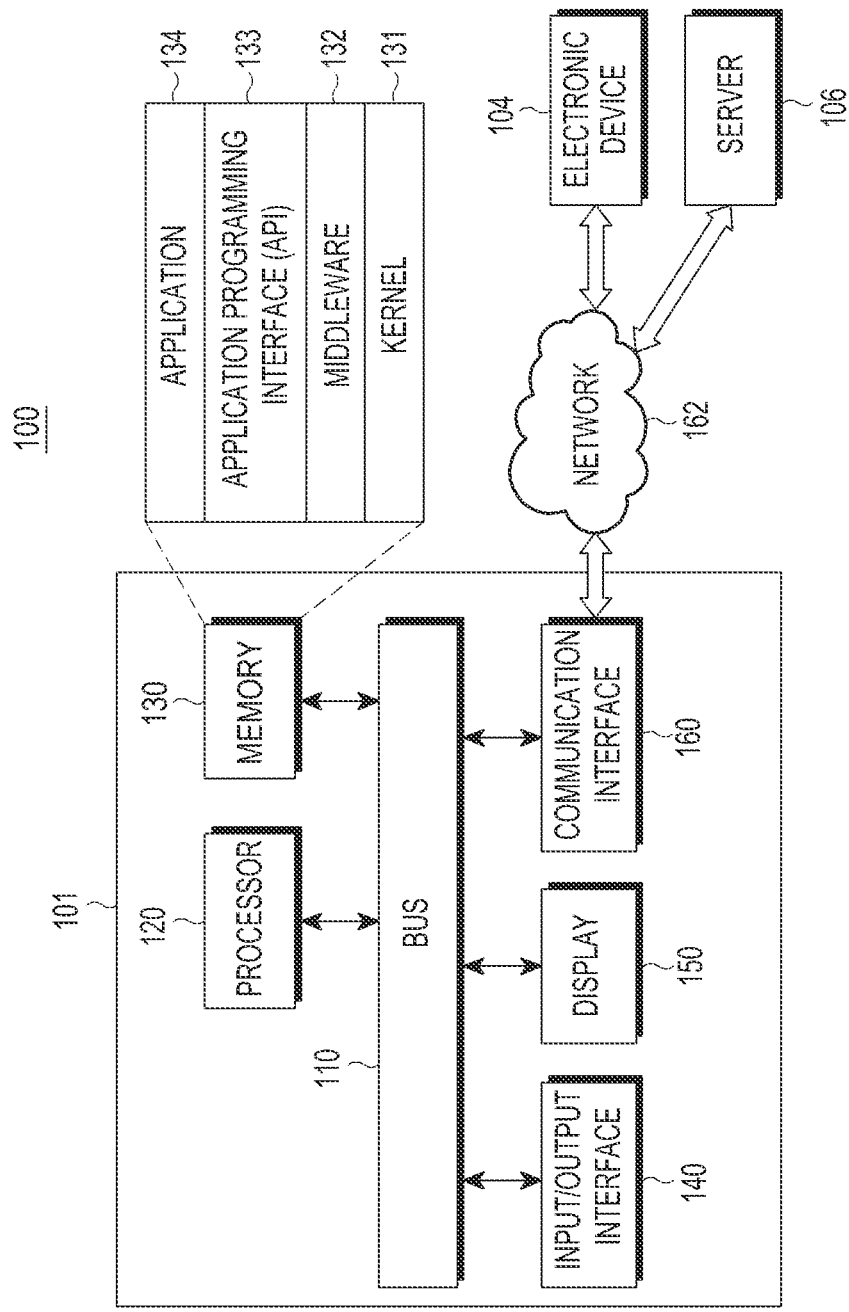
FIG. 1 is an internal block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The term and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "first", "second", or the like used in various embodiments of the present disclosure may modify various component elements in the various embodiments but may not limit corresponding component elements. For example, the above expressions do not limit the sequence and/or importance of the elements. The expressions may be used to distinguish a component element from another component element. For example, a first user device and a second user device indicate different user devices although both are user devices. For example, without departing from the scope of the present disclosure, a first component element may be named a second component element. Similarly, the second component element also may be named the first component element.

It should be noted that if one component element is described as "coupled" or "connected" to another component element, the first component element may be directly coupled or connected to the second component, and a third component element may be "coupled" or "connected" between the first and second component elements. Conversely, when one component element is "directly coupled' or "directly connected" to another component element, it may be construed that a third component element does not exist between the first component element and the second component element.

The terms used in various embodiments of the present disclosure are merely used to exemplify a certain embodiment and should not limit various embodiments of the present disclosure. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Electronic devices according to various embodiments of the present disclosure may be devices adopting a communication function. For example, the electronic devices may include at least one of smart phones, tablet personal computers (PCs), mobile phones, video phones, e-book readers, desktop PCs, laptop PCs, netbook computers, personal digital assistants (PDAs), portable multimedia players (PMPs), MP3 players, mobile medical devices, cameras, wearable devices}e.g., head-mounted-devices (HMDs) such as electronic glasses), electronic clothes, electronic bracelets, electronic necklaces, electronic appcessories, electronic tattoos, or smart watches.

An electronic device may be a smart home appliance with a communication function. The smart home appliance as an example of the electronic device may include at least one of, for example, a television, a Digital Video Disk (DVD) player, an audio system, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

An electronic device may include at least one of various medical devices such as a magnetic resonance angiography (MRA) scanner, a magnetic resonance imaging (MRI) scanner, a computed tomography (CT) scanner, a scanner, an ultrasonograph, or the like, a navigation device, a Global Positioning System (GPS) receiver, an Event Data Recoder (EDR), a Flight Data Recoder (FDR), a vehicle infotainment device, an electronic equipment for ship (for example a ship navigation device and gyro-compass and the like, avionics, a security device, a head unit for vehicle, an industrial or household robot, automatic teller machine (ATM) in banking facilities or point of sales (POS) in stores.

The electronic devices may include at least one of furniture or a part of a building/structure having a communication function, electronic boards, electronic signature receiving devices, projectors, or various measuring equipment (e.g., equipment for a water supply, an electricity, gases or radio waves). An electronic device according to an embodiment of the present disclosure may be a combination of one or more of above described various devices. An electronic device according to an embodiment of the present disclosure may be a flexible device. The electronic device, however, is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) that uses an electronic device.

Embodiments of the present disclosure provide an image utilizing method based on location information of an image, and accordingly, when a region is designated by an input unit in a state in which the image is displayed, the method sets a Region Of Interest (ROI) of a predetermined size based on the central coordinates of the designated region, obtains actual location information of the ROI, and stores the obtained location information together with an image of the ROI. The location information is stored together when the ROI is designated and thus, it is possible to provide various services based on the location information.

FIG. 1 illustrates a network environment including an electronic device according to various embodiments of the present disclosure.

Referring to FIG. 1, a network environment 100 includes an electronic device 101, an electronic device 104, a server 106, and a network 162. The electronic device 101 may include a bus 110, a processor 120, a memory 130, an input/output interface 140, a display 150, and a communication interface 160. The bus 110 may be a circuit to connect the above-described components with each other and to transfer communication (e.g., control messages) between the above-described components.

The processor 120 may, for example, receive commands from other component elements (e.g., the memory 130, the input/output interface 140, the display 150, and the communication interface 160) through the bus 110, analyze the received commands, and execute calculation or data processing according to the analyzed commands.

According to various embodiments of the present disclosure, a controller may include the processor 120 and the memory 130 for storing information required by the processor 120.

The controller may be a central processing device, and controls general operations of the electronic device 101, and executes operations associated with an image utilizing method that is based on location information of an image according to an embodiment of the present disclosure.

When it is desired to designate a region on an image (for example, a map image, a browser image, and the like) displayed on the display 150 using an input unit according to a clip and/or copy command, the controller recognizes a movement of the input unit until the continuous movement of the input unit is terminated. A closed-curve drawn to clip a region from the image is displayed on the image based on the recognized result, and the controller may select the region in a form of the closed-curve when the locations of a starting point and an end point of the input unit satisfy a standard set in advance. Based on the closed-curve, a ROI may be set. When the closed-curve is completed, the controller may display a clip board that stores clipped and/or copied objects, in a predetermined area of the display 150. For example, the clip board may be displayed to be close to an area of the display 150 where an image is displayed, or may be displayed by being overlaid on image. The clip board is a user interface area including at least a few simplified symbols associated with the clipped and/or copied objects.

The controller may store the objects (an image, text, or the like) clipped and/or copied according to a clip and/or copy command, in a clip board area of the memory 130. The clip board may store the objects until the objects are deleted from the clip board, and the objects may be visually displayed and provided. According to various embodiments of the present disclosure, the clipped or copied objects are referred to as a ROI.

The controller may execute a predetermined application in associated with the clipped object or an application designated by a user, and may provide information associated with the clipped object by displaying the clipped object in an execution mode of the application. For example, when the clipped object is selected on the clip board, a map application is executed and an identification indication and location information associated with a location where the object is clipped may be displayed on a map image. Alternatively, when the clipped object is selected on the clip board, the controller may execute a navigation application and may execute route guidance based on a location corresponding to the clipped object. According to various embodiments of the present disclosure, applications that are based on location information of an object that is stored in the clip board may not be limited to the map application, the navigation application, and the like, and may include all applications that may be available for utilizing an image based on location information of a clipped object.

Information associated with a clipped object (i.e., information associated with a ROI) may include location information. The location information may include the location coordinates of a place corresponding to the clipped object, and the location coordinates may be obtained from an external server. For example, when a region to be clipped and/or copied from the image is designated, the controller may transmit, to the external server, a message for requesting location coordinates of the designated region, and may obtain location information including actual location coordinates that may be obtained in response to the message.

To obtain the information associated with the clipped object (i.e., the information associated with the ROI), the controller may calculate the central coordinates of the ROI that encloses the closed-curve, based on the center of the closed-curve. The ROI is set in the smallest circular shape that is circumscribed about the closed-curve, based on the central coordinates of the closed-curve. The controller may obtain actual location information on a map, which is coordinate information formed of latitude and longitude obtained from the memory 130 or the external server 106, through comparison using a reduced scale on the map based on the calculated central coordinates of the ROI and a radius of the circle. Accordingly, the controller may store, in the memory 130, an image of the ROI and location information of the ROI. As described above, by adding the location information to the image of the ROI, a location associated with the ROI may be determined and thus, a user may conveniently manage the ROI.

The clip board is a user interface area that includes symbols that simplify the image of the ROI or a clipped image, that is, a shape of a clipped region. Accordingly, the region drawn by a user as a closed-curve on a map image, may be clipped and/or copied and may be displayed on the clip board. A symbol or a shape displayed on the clip board may provide a clipped object, that is, an image of the clipped region by processing the same or provide the same as it is. According to various embodiments of the present disclosure, a clipped object included in the clip board may be, for example, a clipped or processed image, although the clipped object indicates an image copied from an image displayed on a screen.

As described above, a clipped and/or copied object and location information of the object that are stored in the memory 130 may be displayed through the clip board, and alternatively, may be displayed through execution of a related application. An object clipped and/or copied from an image displayed on a screen may be referred to as an image of a ROI, and the image of the ROI and location information of the ROI may be displayed through the clip board. The location information of the ROI may include coordinates such as latitude, longitude, and the like, and may include information that describes a title or a characteristic of the ROI, and the information may include text, an image, and the like. The location information of the ROI may also be information that describes the ROI or event information that is updated in real time. Currently collected event information may be output to the clip board, together with the image of the ROI. For example, predetermined event information may be collected based on the characteristic of the selected ROI, and some of the collected event information may be displayed. Information that is basically provided in the ROI and images thereof may be displayed.

According to various embodiments of the present disclosure, an image of a ROI is shown through the clip board and thus, it is advantageous in that the user readily recognizes a desired ROI and the details associated with the desired ROI. The user may also be provided with various services including a navigation function associated with a desired ROI, through selecting an image of the ROI or selecting a menu associated with the ROI.

The memory 130 may store commands or data which may be received from the processor 120 or other elements (for example, the input/output interface 140, the display 150, and the communication interface 160) or created by the processor 120 or other elements. The memory 130 may include programming modules, for example, a kernel 131, a middleware 132, an Application Programming Interface (API) 133, an application 134, or the like. Each of the programming modules described above may be formed of software, firmware, and hardware, or a combination thereof. The memory 130 may store an image of a ROI on the clip board and related location information. The memory 130 may also store a map image for providing a navigation function. The objects clipped or copied according to a clip or copy command are stored in an area called 'clip board,' and the memory 130 may have an area for the clip board. The clip board stores the objects, until a paste command is input or the objects are deleted from the clip board, and visually displays and provides the objects in response to the predetermined command.

The kernel 131 may control or manage system resources (for example, the bus 110, the processor 120, the memory 130, or the like) which are used in performing operations or functions implemented by other programming modules, for example the middleware 132, the API 133 or the applications 134. Furthermore, the kernel 131 may provide an interface through which the middleware 132, the API 133, or the applications 134 may access individual component elements of the electronic device 101 to control or manage them.

The middleware 132 may serve as an intermediary such that the API 133 or the application 134 communicate with the kernel 131 to transmit/receive data. In regard to task requests received from the applications 134, the middleware 132 may perform a control for the task requests using, for example, a method of assigning a priority for using the system resources (e.g., the bus 110, the processor 120, and the memory 130) of the electronic device 101 to at least one of the applications 134.

The API 133 is an interface by which the applications 134 controls functions provided from the kernel 131 or the middleware 132, and may include, for example, at least one interface or function (e.g., instructions) for file control, window control, image processing, or text control.

The input/output interface 140 may transfer a command or data input by a user through an input/output device (for example, a sensor, a keyboard, or a touch screen) to the processor 120, the memory 130, and the communication interface 160, for example, through the bus 110. The input/output interface 140 may provide, to the processor 120, data associated with an input unit, such as a user finger, an electronic pen, and the like, provided through a touch screen.

The input device of the input/output interface 140 may include a touch panel, a digital pen sensor, a key, an ultrasonic input device, or the like. The touch panel may recognize a touch input based on at least one scheme among, for example, a capacitive scheme, a resistive scheme, an infrared scheme, and an ultrasonic scheme. The touch panel may further include a control circuit. The capacitive scheme touch panel may recognize physical contact or proximity. The touch panel may further include a tactile layer. In this case, the touch panel may provide a user with a tactile reaction. The input/output interface 140 may output a command or data received from the processor 120, the memory 130, and the communication interface 160, for example, through the bus 110, to an input/output device (for example, a speaker or display).

The display 150 may display various information (for example, multimedia data or text data) to the user. The display 150 may display a screen by dividing the screen into a screen that displays an image and a screen where objects clipped and/or copied from the image are disposed, or may lay the screen where the clipped and/or copied objects are disposed over the screen that displays the image, for the display.

The communication interface 160 may connect communication between the electronic device 101 and an external electronic device (for example, the electronic device 104 or the server 106). For example, the communication interface 160 may be connected to a network 162 through wireless or wired communication to communicate with the external device. The wireless communication may include at least one of, for example, Wi-Fi, Bluetooth (BT), Near Field Communication (NFC), Global Positioning System (GPS) and cellular communication (for example, Long Term Evolution (LTE), LTE-A, Code Division Multiple Access (CDMA), Wideband CDMA (WCDMA), Universal Mobile Telecommunication System (UMTS), Wireless Broadband (WiBro), Global System for Mobile communication (GSM), and the like). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment of the present disclosure, the network 162 may be a telecommunication network. The communication network may include at least one of a computer network, the Internet, the Internet of things, and a telephone network. According to an embodiment of the present disclosure, a protocol (for example, a transport lay protocol, data link layer protocol, or a physical layer protocol) for communication between the electronic device 101 and the external device may be supported by at least one of the application 134, the application programming interface 133, the middleware 132, the kernel 131, and the communication interface 160.

Each of the above described elements of the electronic device according to various embodiments of the present disclosure may be formed of one or more components, and the name of a corresponding element may vary according to the type of an electronic device. The electronic device may include at least one of the above described elements, and may exclude some of the elements or further include other additional elements. Further, some of the elements of the electronic device according to various embodiments of the present disclosure may be coupled to form a single entity while performing the same functions as those of the corresponding elements before the coupling.

The term "module" as used in various embodiments of the present disclosure may mean, for example, a unit including one of hardware, software, and firmware or any combination of two or more of them. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

At least some of the devices (e.g., modules or functions thereof) or the method (e.g., operations) according to the present disclosure may be implemented by a command stored in a computer-readable storage medium in a programming module form. When the instruction is performed by at least one processor (e.g., the processor 120), the at least one processor may perform a function corresponding to the instruction. The computer-readable storage medium may be, for example, the memory 130. At least some of the programming modules may be implemented (e.g., executed) by, for example, the processor 120. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

According to an embodiment of the present disclosure, an electronic device includes a display unit for displaying an image, a memory having a storage area for a clip board, and a controller that executes a control to set a ROI on the image, to obtain location information associated with the ROI, and to store the obtained location information in the clip board together with an image of the ROI.

According to an embodiment of the present disclosure, the controller may execute a control to display, on a predetermined area of the display unit, a clip board that stores the obtained location information together with an image of the ROI.

According to an embodiment of the present disclosure, as the ROI is set based on a closed-curve drawn by an input unit on the image, the controller may execute a control so as to display the image of the ROI on the predetermined location of the clip board.

According to an embodiment of the present disclosure, the ROI is provided in the smallest circular shape that is circumscribed about the closed-curve, based on the central coordinates of the closed-curve.

According to an embodiment of the present disclosure, the location information of the ROI may be coordinate information that is formed of latitude and longitude which are obtained through comparison using a reduced scale on a map based on the central coordinates of the closed-curve and a radius of the circle.

According to an embodiment of the present disclosure, when another ROI that is stored in advance exists in the clip board, the controller may execute a control so as to display, on the clip board, detailed information including at least one of distance information that is based on the obtained location information and location information of the other ROI stored in advance, and route guidance information.

According to an embodiment of the present disclosure, when another ROI that is stored in advance does not exist in the clip board, the controller may execute a control so as to display, on the display unit, a route guidance screen that shows a route between the obtained location information and a current location of the electronic device.

According to an embodiment of the present disclosure, when another ROI that is stored in advance exists in the clip board, the controller may execute a control so as to display, on the display unit, a route guidance screen that shows a route between the obtained location information and location information of the other ROI stored in advance.

According to an embodiment of the present disclosure, when multiple other ROIs stored in advance exist in the clip board, the controller may determine a departure point, a stopover, or a destination based on an order of the ROI and other ROIs stored in advance, which is designated by an input unit, and may execute route guidance based on the determined departure point, the stopover, and the destination.

Figure 2:
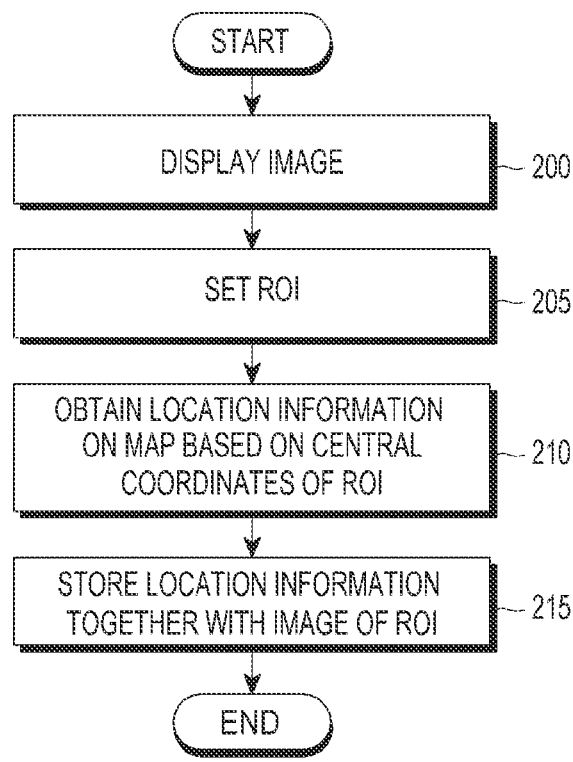
FIG. 2 is a flowchart illustrating an image utilizing method based on location information of an image in an electronic device according to an embodiment of the present disclosure.

FIG. 2 is a flowchart illustrating a method of managing a ROI on a map image in an electronic device according to an embodiment of the present disclosure.

Referring to FIG. 2, the electronic device 101 displays an image in operation 200. The image may be a map image provided from a map application. Alternatively, the image may include all images from which a place, a location, and the like are identifiable, such as an image stored in the memory 130, a map image in a web page, and the like. While the image is displayed, the electronic device 101 may set a ROI in the image, in operation 205. As an example of the methods of setting the ROI, FIG. 3 illustrates a method of designating a ROI using an input unit.

Figure 3:
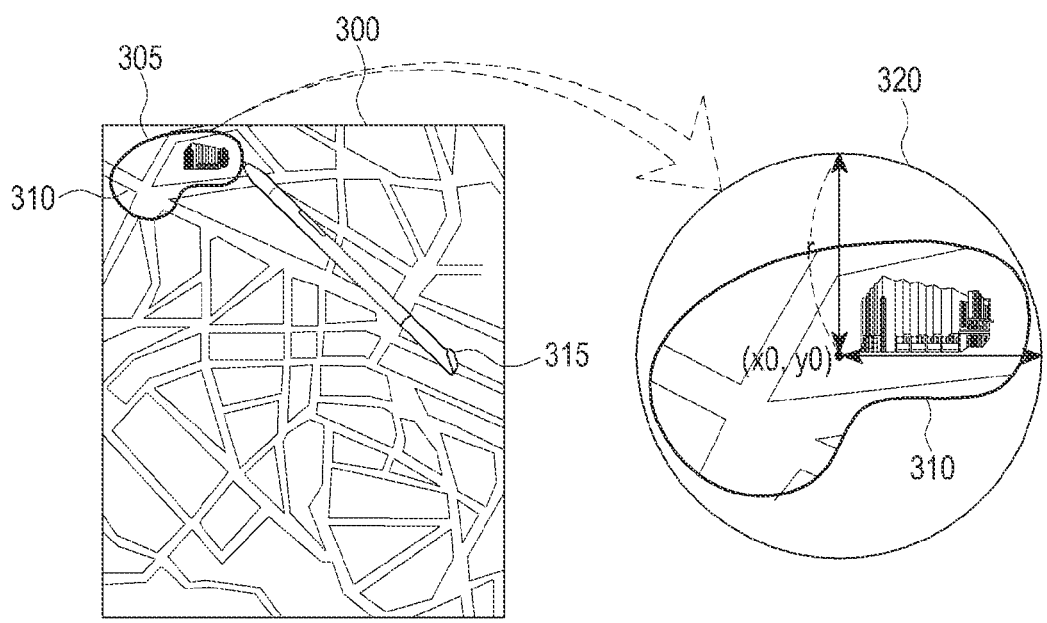
FIG. 3 illustrates a method of designating a Region Of Interest (ROI) on an image according to an embodiment of the present disclosure.

FIG. 3 illustrates a method of designating a Region Of Interest (ROI) on an image according to an embodiment of the present disclosure Referring to FIG. 3, a method of designating a ROI on a map image and an operation of clipping and/or copying a region 310 in a state in which a map image 300 is displayed on the display 150 is illustrated. A line is drawn on the map image 300 along a route of the input unit 315, and when a closed-curve is drawn by the input unit 315, a perforated line 305 may be displayed that indicates the region 310 corresponding to the closed-curve is selected. As described above, a user may set a ROI by drawing a region of a desired form using the input unit 315. Alternatively, when the user touches an object indicating a place, a building, and the like, for example, an icon, in the image, using the input unit 315, a shape of the icon or a region that encloses the icon may be set to be the ROI.

Subsequently, the electronic device 101 may detect the central coordinates of the clipped region 310, may generate the smallest circle 320 that is circumscribed about the clipped region 310 and includes the clipped region 310, and may determine the center of the circle 320 as the center of a ROI. Accordingly, the ROI may be set to be a region having a size corresponding to a radius (r) from the center (x0, y0) of the clipped region, and the ROI 320 may be set to have a circular shape. Although FIG. 3 illustrates a case in which the ROI is set to be a circular shape, the ROI may be set to be various figure shapes.

Referring back to FIG. 2, the electronic device 101 may obtain location information on a map, based on the central coordinates of the ROI 320, in operation 210. The location information on the map may indicate actual coordinate information such as latitude, longitude, and the like. The electronic device 101 compares a length of the radius with a reduced scale of the map image that is currently displayed, based on the origin (x0, y0) and the radius (r), so as to obtain entire location information of the clipped region based on the origin. Approximate values of latitude and longitude corresponding to the upper side, the lower side, the left side, and the right side from the center may be obtained based on the reduced scale of the map information. When the location information is obtained as described above, the electronic device 101 may store the location information together with an image of the ROI, in operation 215. When the image of the ROI is stored, the central coordinates and regional coordinates may be stored together.

An image utilizing method based on location information of an image according to various embodiments of the present disclosure may include displaying an image, setting a ROI on the image, obtaining location information associated with the ROI, and storing the obtained location information together with an image of the ROI.

The ROI may be set based on a closed-curve drawn by an input unit on the image.

The ROI may also be provided in the smallest circular shape that is circumscribed about the closed-curve, based on the central coordinates of the closed-curve.

The location information of the ROI may be coordinate information that is formed of latitude and longitude which are obtained through comparison using a reduced scale of a map based on the central coordinates of the closed-curve and a radius of the circle.

According to the image utilizing method based on location information of an image, the operation of storing the obtained location information together with the image of the ROI may include displaying a clip board that stores clipped and copied objects and displaying the image of the ROI by moving the image of the ROI to a location of the clip board.

When another ROI that is stored in advance does not exist when the obtained location information is stored together with the image of the ROI, a route guidance screen that shows a route between the obtained location information and a current location of the electronic device may be displayed.

When another ROI that is stored in advance exists when the obtained location information is stored together with the image of the ROI, a route guidance screen that shows a route between the obtained location information and location information of the other ROI that is stored in advance may be displayed.

When another ROI that is stored in advance exists in the clip board when the obtained location information is stored together with the image of the ROI, detailed information including at least one of distance information that is based on the obtained location information and location information of the other ROI stored in advance, and route guidance information may be displayed on the clip board.

When multiple other ROIs that are stored in advance exist, the image utilizing method based on location information of an image may include designating an order of the ROI and other ROIs stored in advance, determining a departure point, a stopover, and a destination based on the order, and executing route guidance based on the determined departure point, the stopover, and the destination.

A method of obtaining the central coordinates of the closed-curve and location information on a map is described below with reference to FIG. 4.

Figure 4:
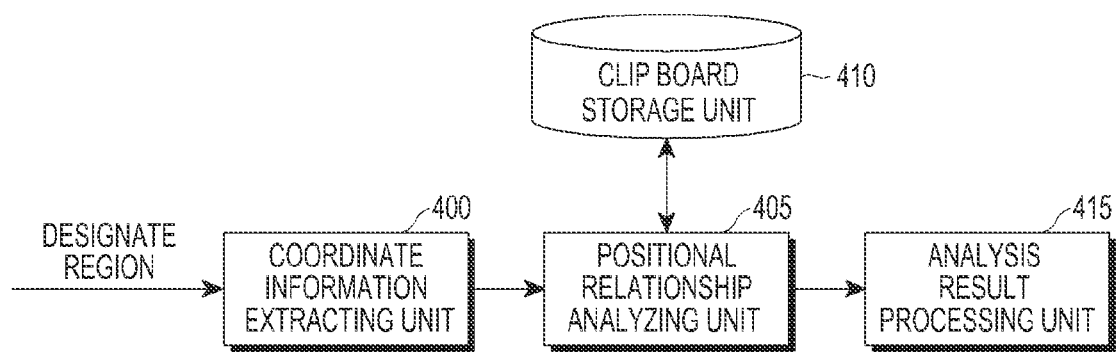
FIG. 4 is a block diagram illustrating an image processing device for a ROI according to an embodiment of the present disclosure.

FIG. 4 is a block diagram illustrating an image processing device for a ROI according to an embodiment of the present disclosure. The image processing device may be embodied as a clip board application.

Referring to FIG. 4, the clip board application may be executed when a region on a map image is designated by a user using an input unit while a map application is executing. Alternatively, the clip board application may be executed when a clip or copy command for the designated region is input. When the clip board application is executed, an image of the designated region may be pasted and displayed in the clip board. A coordinate information extracting unit 400 determines a ROI based on the central coordinates of the designated region, and obtains the central coordinates of the ROI and a radius of the smallest circle that includes the region. The coordinate information extracting unit 400 matches the ROI to an actual location on a map, based on the central coordinates and the radius of the ROI, so as to obtain location information associated with the ROI provided in a circular shape.

For example, when latitude and longitude at a vertex of the ROI provided in a circular shape is (37.008, 100.008) and a radius is 1 cm, and 1 cm indicates 500 m in a currently shown map, approximate latitude and longitude values at the points located 1 cm to the left and to the right from the origin may be expressed as (37.008,100.001) and (37.008, 100.015). In this manner, latitude and longitude values at the points located 1 cm in the upper side and lower side from the origin may be obtained. As a reduced scale becomes larger, an error in the calculation of the approximate latitude and longitude values based on the selected region becomes larger. Accordingly, when a map is magnified by more than a predetermined maximum magnification, an available value may be obtained. When a map is shown to be smaller than a predetermined minimum magnification, only latitude and longitude at the origin may be available. Resolution for obtaining latitude and longitude may be set to be accurate based on a degree of magnification, or the value may be set by a user.

A positional relationship analyzing unit 405 determines whether location information that is stored in advance exists in a clip board, with reference to a clip board storage unit 410. When existing location information does not exist, the positional relationship analyzing unit 405 may analyze a relationship between a current location and location information of the ROI. Accordingly, an analysis result processing unit 415 analyzes a place corresponding to the ROI and displays an analysis result including a route from the current location to the place, information associated with each location, and the like.

Figure 5:
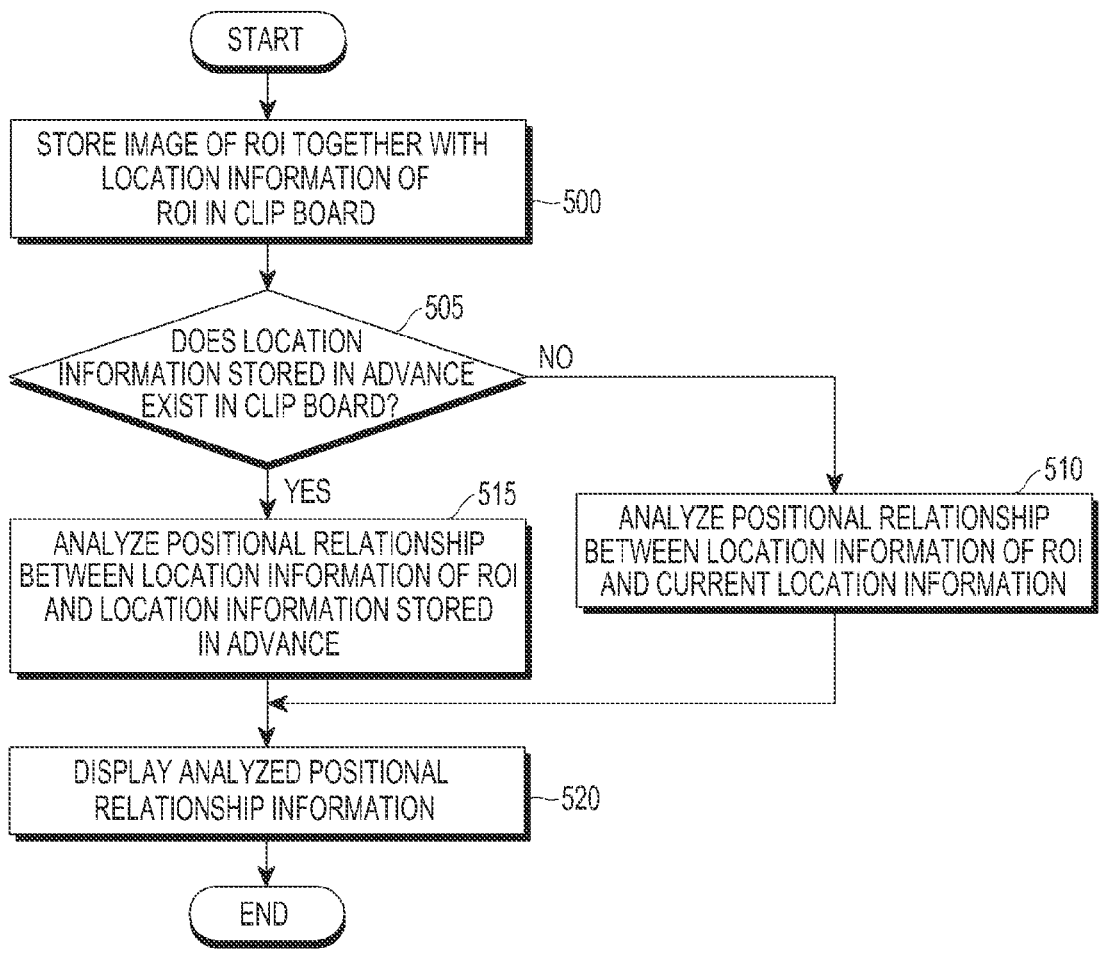
FIG. 5 is a flowchart illustrating management of location information of a ROI on an image according to an embodiment of the present disclosure.

FIG. 5 is a flowchart illustrating management of location information of a ROI on a map image according to an embodiment of the present disclosure.

Referring to FIG. 5, the electronic device 101 may store, in a clip board, location information associated with a ROI together with an image of the ROI, according to a request for storing the ROI, in operation 500. The request for storing the ROI may be generated when a user inputs a predetermined signal, such as drawing a desired region through an input unit, selecting a desired object, or the like while an image related to a place and the like is displayed. When the request for storing the ROI is generated while the place-related image is displayed, the image of the ROI may be displayed in a predetermined area of the display 150. For example, a clip board may be displayed by being overlaid on the place-related image, or the place-related image may be reduced and the clip board may be displayed to be close to the image.

Figure 6:
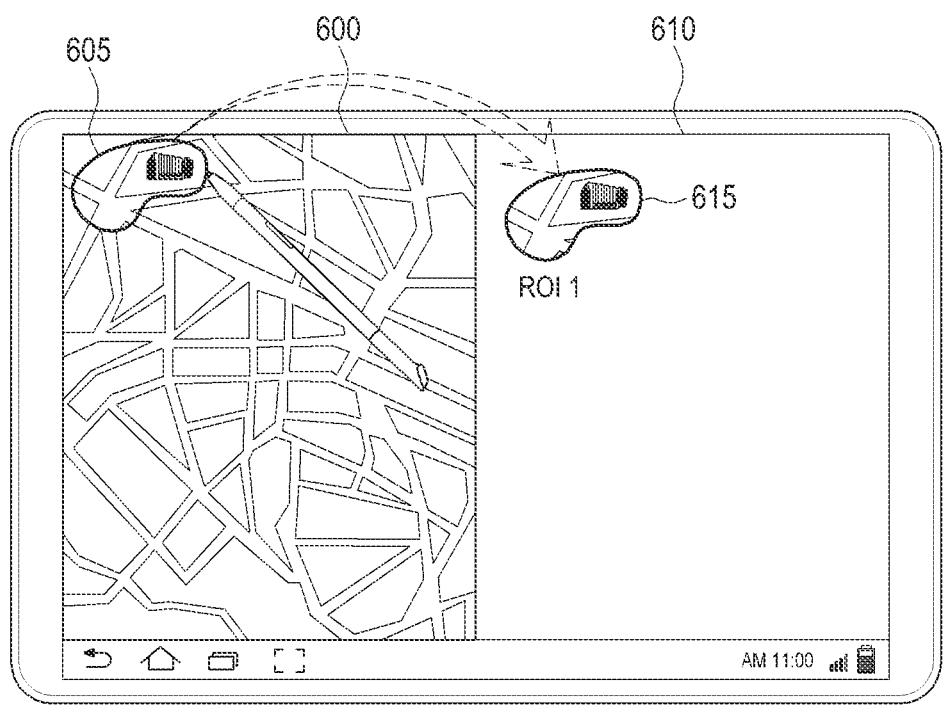
FIG. 6 illustrates an example of a screen for designating a ROI and storing the designated ROI according to an embodiment of the present disclosure.

FIG. 6 illustrates an example of a screen for designating a ROI and storing the designated ROI according to an embodiment of the present disclosure.

Referring to FIG. 6, after a user draws a desired region as a closed-curve 605 on a map image 600 and selects the region, a copied image 615 that has an identical shape as the closed-curve 605 is moved to a predetermined location of a clip board 610 and displayed as a ROI. An image of the ROI that is stored in the clip board 610 may be displayed as an image in an identical shape as the closed-curve 605, in a simplified (reduced) form, or in an icon form. For example, the image of the ROI in the clip board 610 may be displayed together with location information of the ROI. Alternatively, when the user selects an icon indicating a building in the map image 600, a shape of the icon or a region that encloses the icon may be set to be the ROI and may be stored in the clip board 610.

Referring back to FIG. 5, when the image of the ROI and the location information are stored in the clip board 610, the electronic device 101 may determine whether location information that stored in advance exists in the clip board in operation 505. When the location information stored in advance does not exist, a positional relationship between the location information of the ROI and current location information is analyzed in operation 510, and the analyzed positional relationship information may be displayed in operation 520.

Figure 7A:
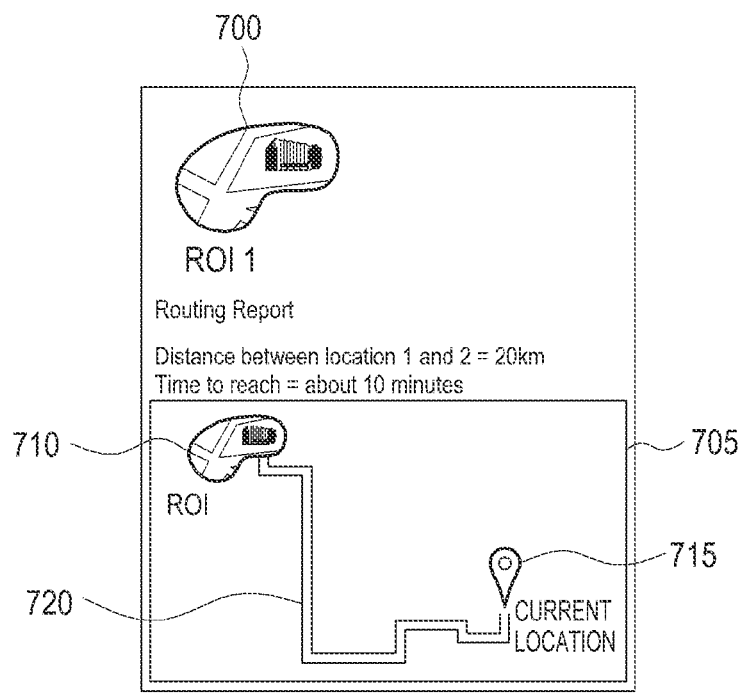
FIGS. 7A and 7B illustrate examples of a service screen that utilizes location information of a plurality of ROIs according to an embodiment of the present disclosure.

FIG. 7A illustrates an example of a service screen that utilizes location information of a plurality of ROIs according to an embodiment of the present disclosure.

Referring to FIG. 7A, an image 700 of a ROI may be displayed in a clip board, and a navigation screen 705 that shows a route 720 between a location 710 of the ROI and a current location 715 may be provided in the clip board based on the location information of the ROI. Alternatively, when a user input for selecting the image 700 of the ROI in the clip board is generated, a navigation application is executed and the navigation screen 705 that shows the route 720 between the location 710 of the ROI and the current location 715 may be provided in a navigation application execution mode. According to an embodiment of the present disclosure, when the image 700 of the ROI is selected from the clip board, a type of an executable application may be displayed based on the image 700 of the ROI and the location information. As described above, by providing a menu that enables the user to select a desired application, utility of the image of the ROI may be increased and the image of the ROI may be connected with various services.

Referring back to FIG. 5, when the location information stored in advance exists, the electronic device 101 may analyze a positional relationship between location information associated with the ROI and location information stored in advance in operation 515, and display an analyzed positional relationship information in operation 520. The analyzed positional relationship information may be shown to the user through the clip board, and alternatively, may be provided through execution of a previously set application or an application that is designated by the user.

Figure 7B:
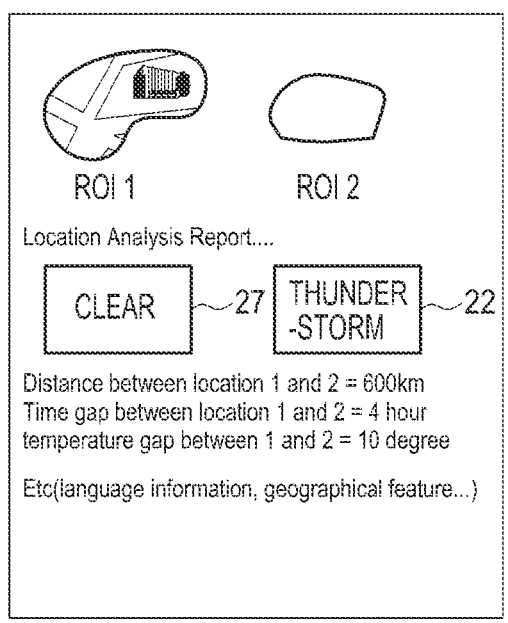

FIG. 7B illustrates an example of a service screen that utilizes location information of a plurality of ROIs according to an embodiment of the present disclosure.

Referring to FIG. 7B, a plurality of images of ROIs may be displayed on a clip board, and information based on the location information of the ROIs may be provided in the clip board. FIG. 7B illustrates an example of a screen that displays information associated with two regions, and provides comparison and analysis information 22 and 27 associated with a relative distance, a time or temperature difference, weather, or the like between two regions, obtained based on the origin coordinates of the two regions. When a departure point and a destination are determined from among the plurality of ROIs, the weather of the destination expected after an estimated time may be displayed, instead of the current weather of the destination.

Figure 8A:
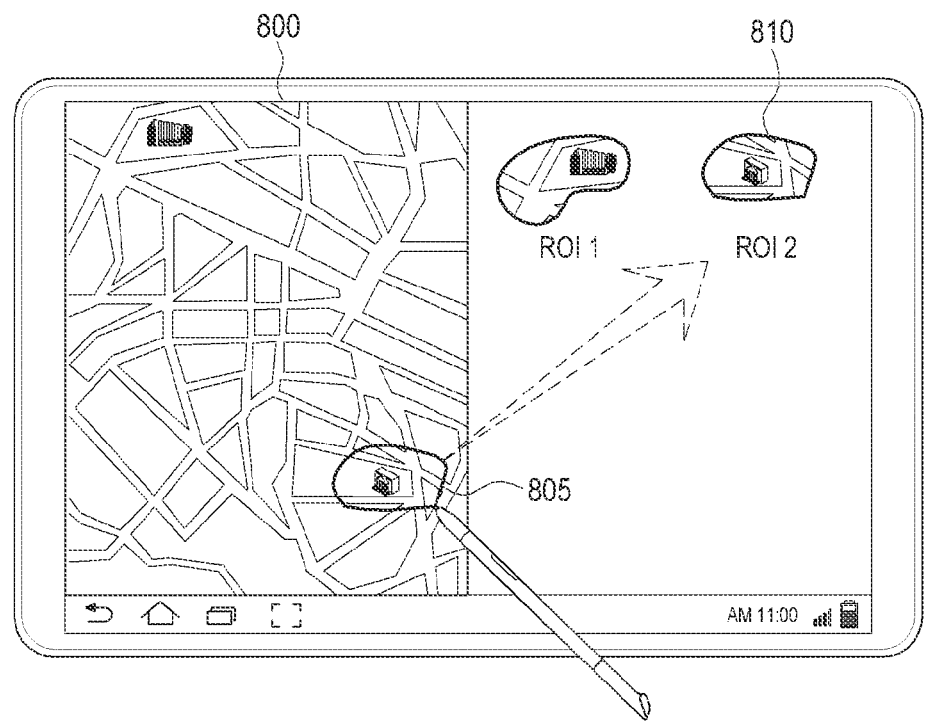
FIGS. 8A and 8B illustrate examples of a method of designating a plurality of ROIs according to an embodiment of the present disclosure.
Figure 8B:
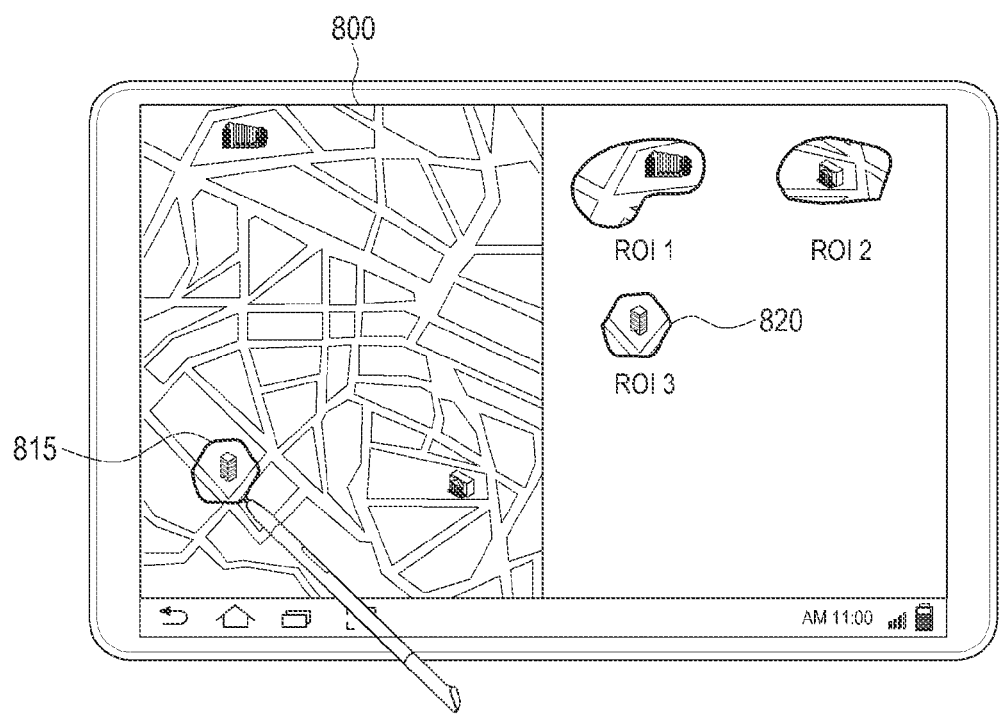

FIGS. 8A and 8B illustrate an example of a method of designating a plurality of ROIs according to an embodiment of the present disclosure.

Referring to FIG. 8A, an example is illustrated in which another region 805 of a map image 800 is designated and is moved to a clip board while a ROI 1 including location information is stored in the clip board. When an image of the region 810 is stored in the clip board, location information of the region 810 may be stored together, as a ROI 2 810. FIG. 8B illustrates a case in which a region 815 is designated successively from the map image of FIG. 8A, or is designated from another map image, and is stored in a clip board as a ROI 3 820. As shown in FIGS. 8A and 8B, selection with respect to a plurality of ROIs may be possible, and navigation information associated with the plurality of ROIs may be provided in the clip board.

Figure 9:
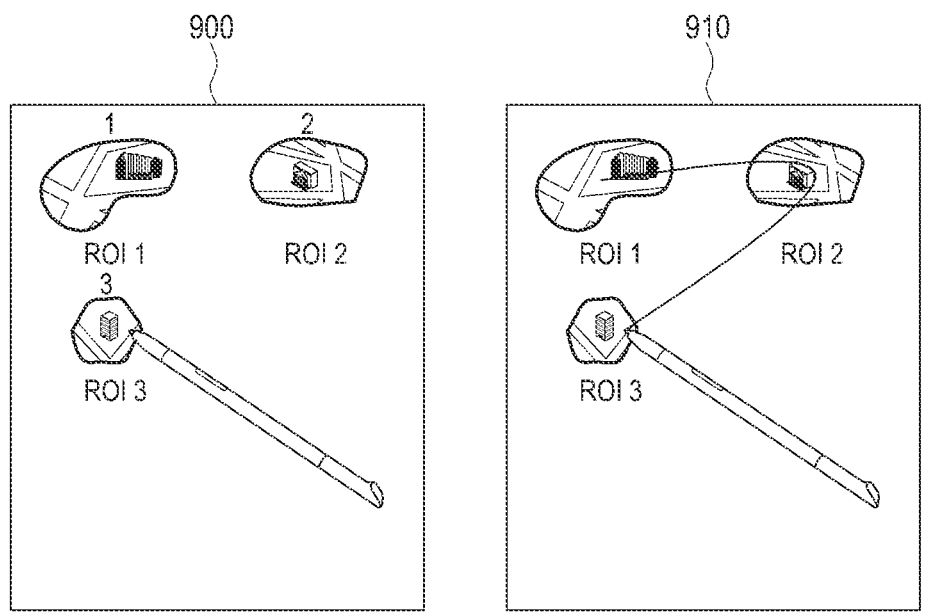
FIG. 9 illustrates an example of a screen, which shows a method of designating an order of a plurality of ROIs according to an embodiment of the present disclosure.

FIG. 9 illustrates an example of a screen, which shows a method of designating an order of a plurality of ROIs according to an embodiment of the present disclosure.

Referring to FIG. 9, a method of determining a departure point, a stopover, and a destination of location information while objects corresponding to a plurality of ROIs, for example, images or icons, are displayed on a clip board is illustrated. FIG. 9 illustrates an individual touch scheme 900 in which a user touches objects of ROIs on the clip board, one for each time, and a drag scheme 910 in which the user sequentially selects objects of the ROIs while maintaining a touch input, so as to designate an order. The individual touch scheme 900 may handwrite a number for an object of each ROI so as to determine an order. Alternatively, the drag scheme 910 connects the objects with a single line so as to set a departure point, a stopover, and a destination, at a time.

Figure 10:
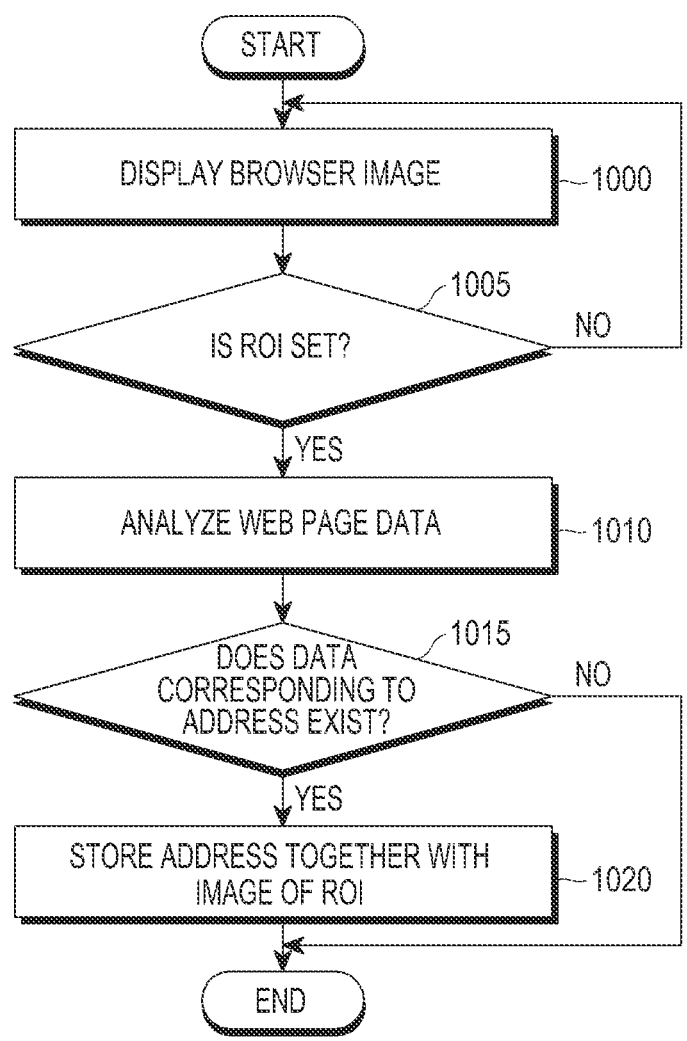
FIG. 10 is a flowchart illustrating management of location information of a ROI on a browser image according to an embodiment of the present disclosure.

FIG. 10 is a flowchart illustrating management of location information of a ROI on a browser image according to an embodiment of the present disclosure.

Referring to FIG. 10, the electronic device 101 may display a browser image in association with execution of a web application, in operation 1000. The electronic device 101 determines whether a ROI is set on the browser image by an input unit in operation 1005, and analyzes web page data in operation 1010 when the ROI is set. Subsequently, the electronic device 101 may determine whether data corresponding to an address exists in operation 1015, and when the data corresponding to the address exists, the electronic device 101 may store the address in a clip board together with an image of the ROI in operation 1020. When the data corresponding to the address does not exist, the image of the ROI may be stored in the clip board. However, according to various embodiments of the present disclosure, when the data corresponding to the address does not exist, the electronic device 101 may analyze the content of the text in the web page, may estimate an address name based on the content of the text, and may store the estimated address name together with the image of the ROI. For example, the electronic device 101 may display the estimated address name so as to enable a user to set the address.

Figure 11A:
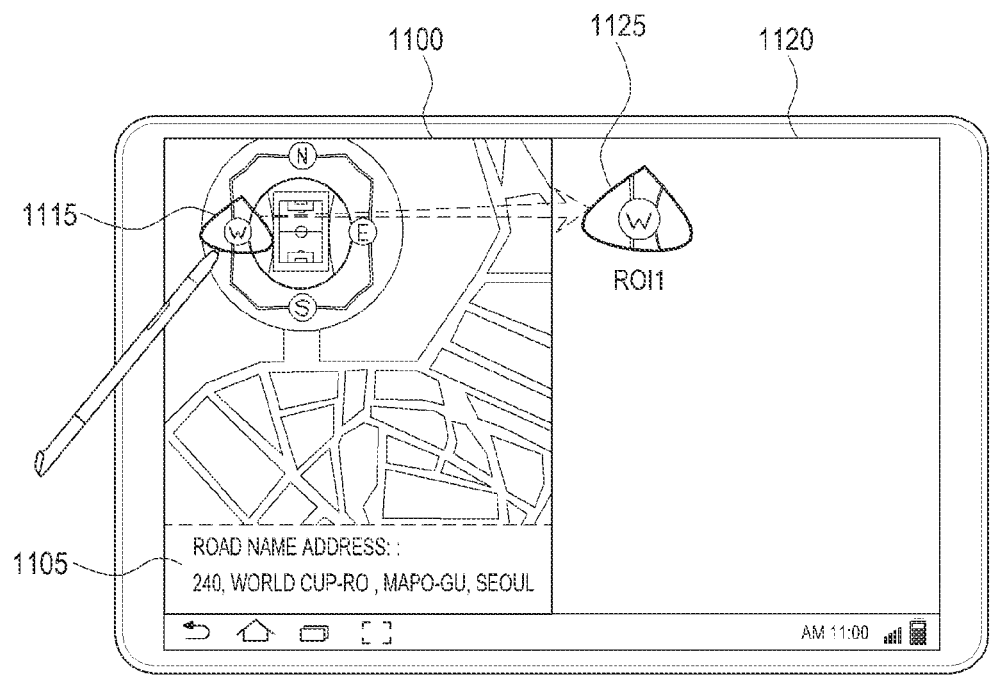
FIGS. 11A and 11B illustrate examples of a screen for designating a ROI on a browser image, and for storing the designated ROI according to an embodiment of the present disclosure.

FIG. 11A illustrates an example of a screen for designating a ROI on a browser image, and for storing the designated ROI according to an embodiment of the present disclosure.

Referring to FIG. 11A, a case is illustrated in which an object 1125 corresponding to a region 1115 is stored in a clip board 1120, in response to a clip and/or copy command with respect to the region 1115 of an image 1100 of a web page, as opposed to a map. The web page may include the image 1100 and text 1105, and the electronic device 101 may determine whether data corresponding to an address format exists in the web page. The electronic device 101 may extract information corresponding to the address from among text associated with the image included in web pages. When at least two addresses exist, the electronic device 101 may enable a user to set a representative address for the clipped image.

Figure 11B:
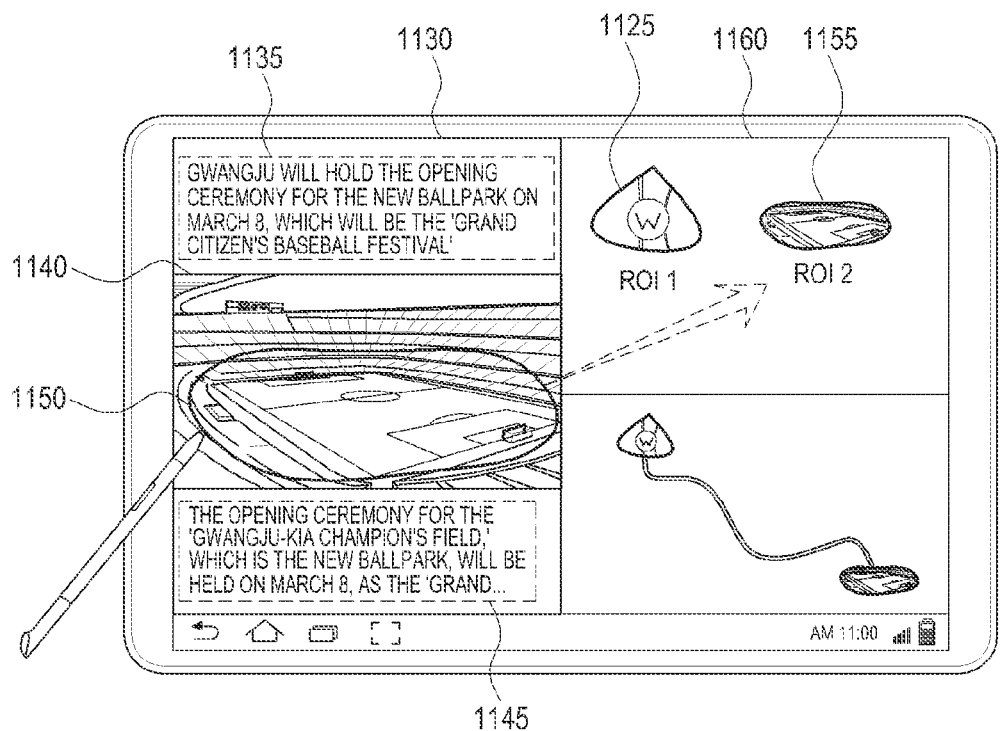

FIG. 11B illustrates a case of providing navigating information associated with a route between ROIs, based on respective address formats stored in a web page according to an embodiment of the present disclosure.

Referring to FIG. 11B, a web page 1130 may include an image 1140 region and text regions 1135 and 1145. A user designates a region 1150 to be clipped from the image region 1140, and pastes the clipped region to a location of the clip board 1160. When objects 1125 and 1155 of a plurality of ROIs exist in the clip board 1160, a route guidance screen that shows a route between two ROIs may be provided based on location information of two ROIs. In this instance, the navigation function may be executed on the clip board. Alternatively, when ROIs for route guidance are selected on the clip board, a screen of executing a navigation application may be switched into a whole screen.

Figure 12:
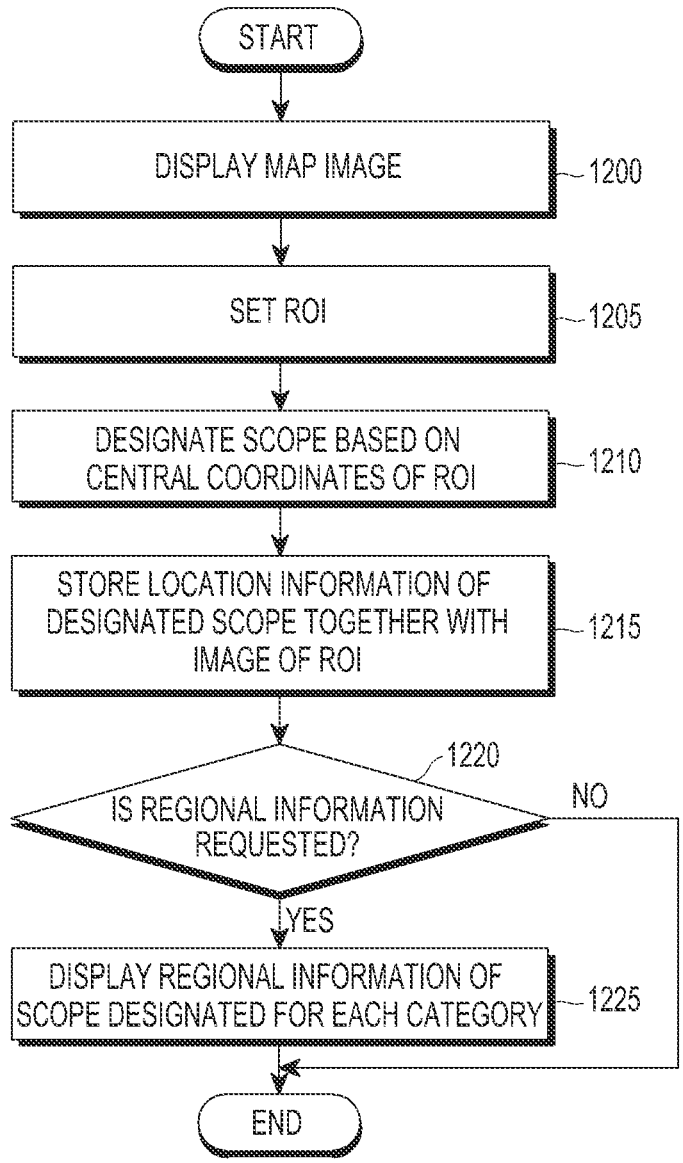
FIG. 12 is a flowchart illustrating provision of regional information of a ROI on an image according to an embodiment of the present disclosure.

FIG. 12 is a flowchart illustrating provision of regional information of a ROI on a map image according to another embodiment of the present disclosure.

Referring to FIG. 12, operations 1200 through 1215 are similar to operations 200 through 215 of FIG. 2 and thus, detailed descriptions thereof will be omitted. In operations 1210 and 1215, a scope may be designated based on the central coordinates of a ROI, and the scope may be set by a user. The electronic device 101 may determine whether a regional information request exists in operation 1220. When regional information request exists, regional information in a scope designated for each category may be displayed in operation 1225. The regional information for each category may be classified based on metadata associated with an image.

Figure 13:
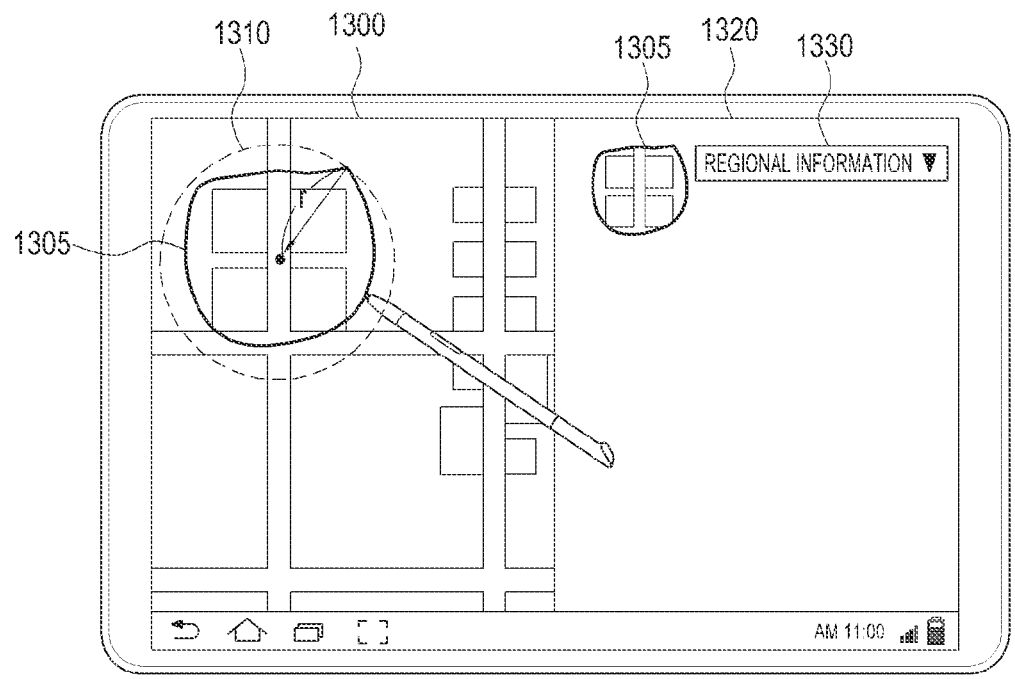
FIGS. 13 and 14 illustrate examples of a screen that provides regional information of a ROI according to an embodiment of the present disclosure.
Figure 14:
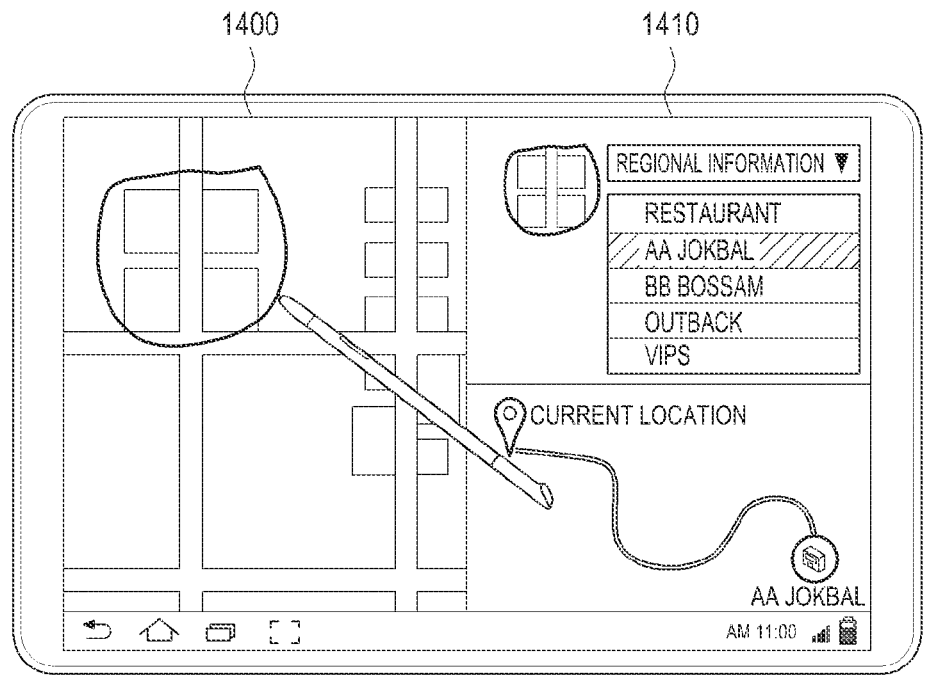

FIGS. 13 and 14 illustrate examples of a screen that provides regional information of a ROI according to another embodiment of the present disclosure.

Referring to FIG. 13, a closed-curve 1305 drawn by an input unit on a map image 1300, a ROI 1310 of a predetermined scope, including the closed-curve 1305, may be determined. The electronic device 101 provides the server 106 with information associated with a location of the ROI 1310, such as a radius, the central coordinates, or the like associated with the ROI 1310, and may receive regional information for each category. Accordingly, a regional information menu 1330, which may be provided together with the object 1305 of the ROI 1310, may be displayed on the clip board 1320.

Referring to FIG. 14, a case is illustrated of outputting a route guidance screen showing a route from a current location to a selected region, when one of the regional information is selected through a regional information menu provided in a clip board 1410, while the clip board 1410 is displayed to be close to a map image 1400. Information associated with a ROI may be shown based on regional information, and the information may be filtered so that information desired by a user may be provided. The regional information may be determined based on the central coordinates of a clipped region and a radius of a region including the corresponding selected region. The electronic device 101 obtains regional information and transfers the regional information to a map providing server, and the map providing server provides the electronic device 101 with information associated with a building, a restaurant, a shop name, or the like included in the received regional information. Accordingly, the electronic device 101 may provide various detailed information in response to a regional information request associated with a ROI.

Figure 15:
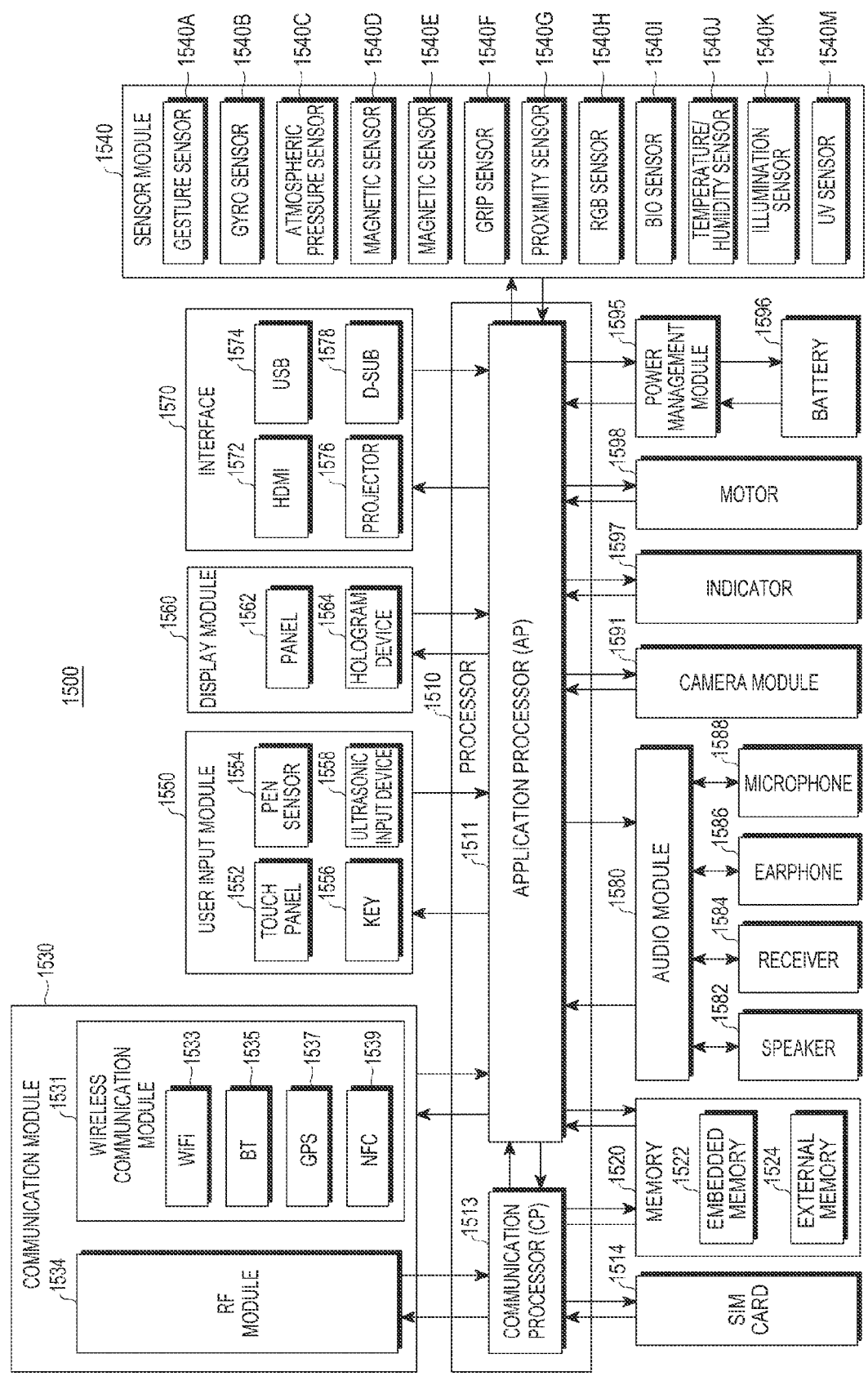
FIG. 15 is a block diagram illustrating a hardware device according to various embodiments of the present disclosure.

FIG. 15 is a block diagram illustrating a hardware device according to an embodiment of the present disclosure. The hardware device 1500 may be, for example, the electronic device 101 of FIG. 1.

Referring to FIG. 15, the hardware device 1500 may include at least one processor 1510, a Subscriber Identification Module (SIM) card 1514, a memory 1520, a communication module 1530, a sensor module 1540, a user input module 1550, a display module 1560, an interface 1570, an audio codec 1580, a camera module 1591, a power management module 1595, a battery 1596, an indicator 1597, and a motor 1598.

The processor 1510, for example, the processor 120, may include one or more Application Processors (APs) 1511 or one or more Communication Processors (CPs) 1513. The processor 1510 may be, for example, the processor 120 of FIG. 1. Although the AP 1511 and the CP 1513 are included in the processor 210 in FIG. 15, the AP 1511 and the CP 1513 may be included in different IC packages, respectively. The AP 1511 and the CP 1513 may be included in one IC package.

The AP 1511 may drive an operating system or an application program so as to control a multitude of hardware or software component elements connected with the AP 1511, and perform processing and calculating of various data including multimedia data. The AP 1511 may be embodied as, for example, a System on Chip (SoC). The processor 1510 may further include a Graphic Processing Unit (GPU) (not shown).

The CP 1513 may manage data links and perform a function of changing communication protocols in communication between electronic devices (for example, the electronic device 101) including hardware 1500 and other electronic devices connected over a network. The CP 1513 may be embodied as, for example, an SoC. The CP 1513 may perform at least a part of a multimedia control function. The CP 1513 may perform identification and authentication of an electronic device in a communication network by using, for example, a subscriber identification module (for example, the SIM card 1514). In addition, the CP 1513 may provide a user with services such as voice calls, video calls, text messages, packet data, or the like.

The CP 1513 may control transmission and reception of data of the communication module 1530. In FIG. 15, although component elements, such as the CP 1513, the power management module 1595, the memory 1520, or the like, are illustrated as separate component elements from the AP 1511, the AP 1511 may be embodied to include at least one (for example, the CP 1513) of the above-described component elements.

The AP 1511 or the CP 1513 may load, to a volatile memory, commands or data received from at least one of a non-volatile memory or other component elements which are connected with the AP 1511 or the CP 1513, and process the same. In addition, the AP 1511 or the CP 1513 may store, in a non-volatile memory, data that is received from or generated by at least one of the component elements.

The SIM card 1514 may be a card embodying a subscriber identification module, and may be inserted into a slot formed in a particular portion of the electronic device. The SIM card 1514 may include unique identification information (for example, Integrated Circuit Card IDentifier (ICCID)) or subscriber information (for example, International Mobile Subscriber Identity (IMSI)).

The memory 1520 may include an embedded memory 1522 or an external memory 1524. The memory 1520 may be, for example, the memory 130 of FIG. 1. The embedded memory 1522 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like). The embedded memory 1522 may be in a form of a Solid-State Drive (SSD). The external memory 1524 may further include a flash drive, for example, a Compact Flash (CF), a Secure Digital (SD), a Micro Secure Digital (Micro-SD), a Mini Secure Digital (Mini-SD), an extreme Digital (xD), a memory stick or the like.

The communication module 1530 may include a wireless communication module 1531 or a Radio Frequency (RF) module 1534. The communication module 1530 may be, for example, the communication module 160 of FIG. 1. The wireless communication module 1531 may include, for example, WiFi 1533, BlueTooth (BT) 1535, a Global Positioning System (GPS) 1537, or a Near Field Communication (NFC) 1539. For example, the wireless communication module 1531 may provide a wireless communication function using wireless frequencies. Additionally and alternatively, the wireless communication module 1531 may include a network interface (for example, a LAN card) or a modem in order to connect the hardware device 1500 with a network (for example, the Internet, a Local Area Network (LAN), a Wire Area Network (WAN), a telecommunication network, a cellular network, a satellite network, a Plain Old Telephone Service (POTS), or the like).

The RF module 1534 may perform transmission and reception of data, for example, RF signals or called electromagnetic signals. Although not illustrated, the RF module 1534 may include, for example, a transceiver, a Power Amp Module (PAM), a frequency filter, a Low Noise Amplifier (LNA), or the like. The RF module 1534 may further include components, for example, a conductor or a cable for transmitting and receiving electromagnetic waves through a free space in wireless communication.

The sensor module 1540 may include at least one of, for example, a gesture sensor 1540A, a gyro-sensor 1540B, an atmospheric pressure sensor 1540C, a magnetic sensor 1540D, an acceleration sensor 1540E, a grip sensor 1540F, a proximity sensor 1540G, a Red-Green-Blue (RGB) sensor 1540H, a bio-sensor 1540I, a temperature/humidity sensor 1540J, an illuminance sensor 1540K, an Ultra Violet (UV) sensor 1540M, and the like. The sensor module 1540 may measure physical quantities or sense an operation state of the electronic device, so as to convert the measured or sensed information to electric signals. Additionally/alternatively, the sensor module 1540 may include, for example, an E-nose sensor (not illustrated), an electromyography (EMG) sensor (not illustrated), an electroencephalogram (EEG) sensor (not illustrated), an electrocardiogram (ECG) sensor (not illustrated), a fingerprint sensor, or the like. The sensor module 1540 may further include a control circuit for controlling at least one sensor included in the sensor module 1540.

The user input module 1550 may include a touch panel 1552, a (digital) pen sensor 1554, a key 1556, or an ultrasonic input device 1558. The user input module 1550 may be, for example, the input/output interface 140 of FIG. 1. The touch panel 1552 may recognize a touch input through at least one of, for example, a capacitive scheme, a resistive scheme, an infrared scheme, and an ultrasonic scheme. In addition, the touch panel 1552 may further include a controller (not shown). The capacitive scheme is capable of recognizing proximity as well as recognizing a direct touch. The touch panel 1552 may further include a tactile layer. In this case, the touch panel 1552 may provide a tactile reaction to a user.

The (digital) pen sensor 1554 may be embodied, for example, using a method identical or similar to a method of receiving a touch input of a user, or using a separate recognition sheet. A keypad or touch key may be used as the key 1556. The ultrasonic (or ultrasonic input device) 1558 inputs an ultrasonic signal through a pen that generates an ultrasonic signal, and the electronic device senses acoustic wave through a microphone (for example, the microphone 1588) and determines data. In this instance, wireless recognition is available. The hardware device 1500 may receive a user input from an external device (for example, a network, a computer, or the server 106 of FIG. 1) that is connected with the hardware device 1500, using the communication module 1530.

The display module 1560 may include a panel 1562 or a hologram 1564. The display module 1560 may be, for example, the display 150 of FIG. 1. The panel 1562 may be, for example, a Liquid Crystal Display (LCD), Active-Matrix Organic Light Emitting Diode (AM-OLED), or the like. The panel 1562 may be embodied to be, for example, flexible, transparent, or wearable. The panel 1562 may be also configured as one module together with the touch panel 1552. The hologram 1564 may display 3D images in the air by using interference of light. The display module 1560 may further include a control circuit for controlling the panel 1562 or the hologram 1564.

The interface 1570 may include, for example, a High-Definition Multimedia Interface (HDMI) 1572, a Universal Serial Bus (USB) 1574, a projector 1576, or a D-subminiature (D-sub). Additionally or alternatively, the interface 1570 may include, for example, a Secure Digital (SD)/ Multi-Media Card (MMC) (not shown) or an Infrared Data Association (IrDA) (not shown).

The audio codec 1580 may convert voices to electric signals, and vice versa. The audio codec 1580 may convert voice information input or output through, for example, a speaker 1582, a receiver 1584, an earphone 1586, the microphone 1588, or the like.

The camera module 1591 is a device for photographing an image and a video. The camera module 1591 may include one or more image sensors (for example, a front lens or a back lens), an Image Signal Processor (ISP) (not illustrated) or a flash LED (not illustrated).

The power management module 1595 may manage power of the hardware device 1500. Although not illustrated, the power managing module 1595 may include, for example, a Power Management Integrated Circuit (PMIC), a charger Integrated Circuit (IC), or a battery fuel gauge.

The PMIC may be mounted to, for example, an integrated circuit or an SoC semiconductor. Charging methods may be classified into a wired charging method and a wireless charging method. The charger IC may charge a battery and prevent over voltage or over current from flowing from a charger. The charger IC may include a charger IC for at least one of the wired charging method and the wireless charging method. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added.

The battery fuel gauge may measure, for example, a remaining quantity of the battery 1596, or a voltage, a current, or a temperature during the charging. The battery 1596 may generate and supply power, and may be, for example, a rechargeable battery.

The indicator 1597 may display a predetermined state, for example, a boot-up state, a message state or a charging state of the entirety or a part (for example, the AP 1511) of the hardware device 1500. The motor 1598 may convert an electrical signal to a mechanical vibration. The processor 1510 may control the sensor module 1540.

Although not illustrated, the hardware device 1500 may include a processing device (for example, a GPU) for supporting a mobile TV. The processing device for supporting the mobile TV may process, for example, media data according to a standard of Digital Multimedia Broadcasting (DMB), Digital Video Broadcasting (DVB), media flow or the like.

The term "module" as used in various embodiments of the present disclosure may mean, for example, a unit including one of hardware, software, and firmware or any combination of two or more of them. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

It may be appreciated that the embodiments of the present disclosure can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It is appreciated that the storage unit included in the electronic device is one example of the machine-readable storage media suitable for storing a program or programs including commands for implementing various embodiments of the present disclosure. Accordingly, the present disclosure includes a program that includes a code for implementing an apparatus or a method defined in any claim in the present specification and a machine-readable storage medium that stores such a program.

The electronic device can receive the program from a program providing apparatus connected to the device wirelessly or through a wire and store the received program. The program providing apparatus may include a program including instructions which enable the electronic device to perform a method of utilizing an image containing location information, a memory for storing information required for the method of utilizing an image containing location information, a communication unit for performing wired or wireless communication with the electronic device, and a controller for transmitting the corresponding program to the electronic device automatically or at the request of the electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of utilizing an image based on location information of the image in an electronic device, the method comprising:
displaying an image;
setting a region of interest (ROI) on the image;
obtaining location information associated with the ROI; and
storing the obtained location information together with an image of the ROI,
wherein the storing of the obtained location information together with the image of the ROI comprises:
displaying a clip board that stores clipped and copied objects; and
displaying the image of the ROI by moving the image of the ROI to a location of the clip board.

2. The method of claim 1, wherein the ROI is set based on a closed-curve drawn by an input unit on the image.

3. The method of claim 2, wherein the ROI is provided in a smallest circular shape circumscribed about the closed-curve, based on central coordinates of the closed-curve.

4. The method of claim 3, wherein the location information of the ROI comprises coordinate information formed of latitude and longitude obtained through comparison using a reduced scale of a map based on the central coordinates of the closed-curve and a radius of the smallest circular shape.

5. The method of claim 1, further comprising:
when another ROI that is stored in advance does not exist when the obtained location information is stored together with the image of the ROI, displaying a route guidance screen that shows a route between the obtained location information and a current location of the electronic device.

6. The method of claim 5, further comprising:
displaying additional information related to the obtained location information and additional information related to the current location of the electronic device.

7. The method of claim 1, further comprising:
when another ROI that is stored in advance exists when the obtained location information is stored together with the image of the ROI, displaying a route guidance screen that shows a route between the obtained location information and location information of the other ROI that is stored in advance.

8. The method of claim 7, further comprising:
displaying additional information related to the obtained location information and additional information related to the location information of the other ROI that is stored in advance.

9. The method of claim 1, further comprising:
when another ROI that is stored in advance exists when the obtained location information is stored together with the image of the ROI, displaying detailed information including at least one of distance information and route guidance information on the clip board based on the obtained location information and location information of the other ROI that is stored in advance.

10. The method of claim 1, further comprising:
designating an order of the ROI and other ROIs stored in advance when multiple other ROIs exist;
determining a departure point, a stopover, and a destination based on the order; and
executing route guidance based on the determined departure point, the stopover, and the destination.

11. An electronic device that utilizes an image based on location information of the image, the electronic device comprising:
a display unit configured to display an image;
a memory including a storage area for a clip board; and
a controller configured to:
set a region of interest (ROI) on the image,
obtain location information of the ROI,
display, on a predetermined area of the display unit, the clip board that stores clipped and copied objects,
display an image of the ROI by moving the image of the ROI to a location of the clip board, and
store, in the clip board, the obtained location information together with the image of the ROI.

12. The electronic device of claim 11, wherein, as the ROI is set based on a closed-curve drawn by an input unit on the image, the controller is further configured to execute a control to display the image of the ROI on a predetermined location of the clip board.

13. The electronic device of claim 12, wherein the ROI is provided in a smallest circular shape circumscribed about the closed-curve, based on central coordinates of the closed-curve.

14. The electronic device of claim 13, wherein the location information of the ROI comprises coordinate information formed of latitude and longitude obtained through comparison using a reduced scale of a map based on the central coordinates of the closed-curve and a radius of the smallest circular shape.

15. The electronic device of claim 11, wherein, when another ROI stored in advance exists in the clip board, the controller is further configured to execute a control so as to display, on the clip board, detailed information including at least one of distance information based on the obtained location information and location information of the other ROI stored in advance, and route guidance information.

16. The electronic device of claim 11, wherein, when another ROI that is stored in advance does not exist in the clip board, the controller is further configured to execute a control so as to display, on the display unit, a route guidance screen that shows a route between the obtained location information and a current location of the electronic device.

17. The electronic device of claim 16, wherein the controller is further configured to execute a control so as to display, on the display unit, additional information related to the obtained location information and additional information related to the current location of the electronic device.

18. The electronic device of claim 11, wherein, when another ROI that is stored in advance exists in the clip board, the controller is further configured to execute a control so as to display, on the display unit, a route guidance screen that shows a route between the obtained location information and location information of the other ROI that is stored in advance.

19. The electronic device of claim 16, wherein the controller is further configured to execute a control so as to display, on the display unit, additional information related to the obtained location information and additional information related to the location information of the other ROI that is stored in advance.

20. The electronic device of claim 12, wherein, when multiple other ROIs that are stored in advance exist in the clip board, the controller is further configured to:
execute a control so as to determine a departure point, a stopover, and a destination based on an order of the ROI and the other ROIs stored in advance, which is designated by an input unit, and
execute a route guidance based on the determined departure point, the stopover, and the destination.

* * * * *